United States Patent Office.

VICTOR G. BLOEDE, OF BROOKLYN, NEW YORK.

Letters Patent No. 61,991, dated February 12, 1867.

IMPROVED MUCILAGINOUS COMPOUND.

The Schedule referred to in these Letters Patent and making part of the same.

TO ALL WHOM IT MAY CONCERN:

Be it known that I, VICTOR BLOEDE, of Brooklyn, in the county of Kings, and State of New York, have invented a new and improved Mucilaginous Compound; and I do hereby declare that the following is a full, clear, and exact description thereof, which will enable others skilled in the art to make and use the same.

This invention relates to a mucilaginous compound obtained by treating common wheat starch with a mixture of acids, applied in such a manner and proportion that a perfectly white gum can be produced, fit for photographers' and for other delicate work; or gums of a more or less dark hue, according to the work for which the gum is to be used.

For the preparation of the different classes of my gum, I first make a mixture of nitric acid and hydrochloric acid in about the following proportion: nitric acid, one pound; hydrochloric acid, fifteen to twenty grains. Then, for the purpose of producing my gum No. 1, I take one pound of common wheat starch and make it into a stiff dough with water containing from eighty to one hundred (more or less) drops of the above-named acid compound. After the ingredients have been worked long enough to form a homogeneous mass, I spread the same in thin strata on sheets of iron, which are placed in a baker's oven and exposed to a heat not exceeding 260° F. After having been thoroughly dried, the gum is scraped off and preserved in lumps, or a solution may be made from it by boiling it in water. A good gum is also produced by treating starch with nitric acid alone, in the proportion of from fifteen to forty pounds of acid to two thousand pounds of starch. My gum No. 2 differs from that of No. 1 only in being not quite so carefully prepared, having been exposed to a greater heat. My gum No. 3 differs from the others in having a larger percentage of water in its preparation. It is very adhesive, and may be used as a substitute for white glue. My gum No. 4 is a crude quality, made by placing the starch in the form of a damp powder, together with the acids and water, into a sheet-iron drum, similar to those used in roasting coffee, and heating it over a very slow fire. This gum is also very adhesive. If the gum is dissolved it is liable to deposit a light mould, which can be prevented by adding a few drops of oil of bitter almonds. This gum can be produced without complicated apparatus, and with comparatively little expenditure of time and labor. It forms a cheap and efficient substitute for gum arabic, gum tragacanth, and in most cases even for white glue. It is not liable to sour or decay, and being perfectly neutral, it does not injure the most delicate fabric or color. When pure, my gum is perfectly odorless. By the use of hydrochloric acid, in combination with nitric acid, a portion of the chlorine is set free, and it serves to bleach the gum and to render the same white.

I do not claim as my invention the process of treating starch with acids, but what I claim as new, and desire to secure by Letters Patent, is—

1. The gum produced by treating starch with a compound of nitric and hydrochloric acids mixed together, substantially as and for the purpose described.

2. The within-described process of producing gum from starch by treating the same with nitric acid in about the proportion herein set forth, and drying it on metal sheets at a heat of about 260° F., as specified.

3. The combination of oil of almonds with an aqueous solution of gum prepared by treating starch with acids, substantially as and for the purposes set forth.

VICTOR G. BLOEDE.

Witnesses:
WM. F. McNAMARA,
ALEX. F. ROBERTS.